United States Patent [19]

Starner et al.

[11] Patent Number: 4,722,989
[45] Date of Patent: Feb. 2, 1988

[54] PROCESS FOR PRODUCING POLYURETHANE/UREA ELASTOMERS

[75] Inventors: William E. Starner, Freeland; Barton Milligan, Coplay; Jeremiah P. Casey, Emmaus, all of Pa.

[73] Assignee: Air Products and Chemicals, Inc., Allentown, Pa.

[21] Appl. No.: 25,911

[22] Filed: Mar. 16, 1987

[51] Int. Cl.$^4$ ............................................. C08G 18/10
[52] U.S. Cl. ....................................... 528/64; 528/85
[58] Field of Search ................................... 528/64, 85

[56] References Cited

U.S. PATENT DOCUMENTS 3,456,037 7/1969 Hoeschele ............................ 528/64

Primary Examiner—Maurice J. Welsh
Attorney, Agent, or Firm—Russell L. Brewer; James C. Simmons; William F. Marsh

[57] ABSTRACT

This invention relates to a solvent-free process for producing polyurethane/urea elastomers wherein an aromatic diisocyanate is reacted with a compound having active Zerewitinoff hydrogen atoms and an aromatic diamine chain extender. The improvement for producing urethanes having a wide range of properties comprises including a urethane-linked diisocyanate in the polyurethane urea elastomer. The urethane-linked diisocyanate is one that is formed by reacting toluenediisocyanate or substituent thereof with a short chain diol under conditions such that the urethane linked diisocyanate comprises two equivalents isocyanate per equivalent diol.

23 Claims, No Drawings

PROCESS FOR PRODUCING POLYURETHANE/UREA ELASTOMERS

TECHNICAL FIELD

This invention relates to a process for producing polyurethane/urea elastomers using a solvent-free technique and to the resulting elastomers.

BACKGROUND OF THE INVENTION

Polyurethane/urea elastomers are well-known and have wide use in the manufacture of a variety of products. The polyurethane/urea elastomers are formed by reacting a polyisocyanate with a composition having reactive hydrogen atoms and then chain extending, usually with a short chain reactant. Many systems are prepared by reacting an aromatic diisocyanate with a polyol, usually a long chain polyether or polyester diol, and then chain extending either with a short chain diol or aromatic diamine. Depending upon the reactivity of the aromatic diisocyanate and polyol, two techniques are widely used in the manufacture of such polyurethane/urea elastomers. One technique is a prepolymer technique wherein the aromatic diisocyanate is reacted with a long chain polyol and then chain extended with an aromatic diamine. Another is the reaction or liquid injection technique (RIM or LIM) wherein all of the reactants are mixed simultaneously, injected or cast into a mold and cured.

Representative patents which show the manufacture of polyurethane/urea systems include:

U.S. Pat. No. 3,285,879 which discloses the manufacture of polyurethane/urea systems by reacting an aromatic isocyanate with a long chain polyol and curing the prepolymer with a N-monalkyl aromatic diamine.

U.S. Pat. No. 4,374,210 discloses the manufacture of polyurethane systems by the RIM technique wherein an aromatic diisocyanate; namely methylene di(-phenylisocyanate) is reacted with a long chain polyol and an alkyl-substituted aromatic diamine.

British patent 981,935 discloses a process for producing polyurethane-urea elastomers by reacting toluenediisocyanate with a long chain polyol, e.g., polytetramethylene glycol, to form a prepolymer and then reacting the prepolymer with a chemically hindered aromatic diamine.

To date, processes for producing solid form castable polyurethane elastomers are limited due to a variety of factors. First, many aromatic diisocyanates are toxic and exhibit high volatility. This toxicity factor coupled with high volatility requires special handling techniques. Second, the aromatic diisocyanates are reactive with aromatic diamines and the concentration and type of aromatic diamines used in the process are limited depending upon their particular reactivity with the isocyanate. Third, the isocyanate content in the prepolymer is fixed within a narrow range, and if additional isocyanate is added to the prepolymer to increase isocyanate content, reactivity may be too great or the resultant physical properties unacceptable for end use applications. Fourth, the viscosity of the resultant prepolymer is too high for the castable elastomer to be introduced into a mold. Attempts to reduce viscosity by the technique of heating often work to a disadvantage, particularly if aromatic diamine chain extenders are incorporated into the system, because of the increased reactivity at higher reaction temperatures. Higher temperatures also result in side reactions of the prepolymer to form allophanates.

Some of the problems noted above have been addressed but solutions have been limited. For example, there is literature illustrating various solutions to toxicity of aromatic diisocyanates by the reaction of the aromatic diisocyanate with short chain diols. However, the resultant product was a solid at polyurethane formation temperatures, and urethane systems utilizing such urethane linked diisocyanates required the use of solvents. Illustrative patents representing such processes for solving the volatility problem include the following:

U.S. Pat. No. 3,285,951 discloses the preparation of adducts of 2,4-toluenediisocyanate and 2,3-butanediol containing 85% meso isomer, with the mole ratio of toluenediisocyanate to butanediol being at least 2:1 preferably 2-4:1, for use in preparing polyurethanes. In one example, a product was prepared by dissolving toluenediisocyanate in a suitable solvent, such as hexane, stirring at high speed and adding butanediol to the solution. As the reaction was carried out, a solid white powder precipitated. The precipitate then was reacted with a millable gum of polypropylene glycol, butanediol and toluenediisocyanate.

U.S. Pat. No. 3,218,348 discloses the preparation of stable urethane polyisocyanate solutions by the sequential reaction of a polyisocyanate e.g., toluenediisocyanate, with a polyol mixture. To avoid crystallization on standing the polyisocyanate was reacted with a triol and then the resulting intermediate product was reacted with a diol. The patentees noted that when the procedure set forth in the 2,969,386 patent described above, was carried out adding the diol first and then the triol or alternatively, simultaneously adding the diol and triol to the isocyanate in the presence of organic solvent, the reaction product was unstable in the solution and would crystallize within a matter of minutes or days.

U.S. Pat. No. 3,076,770 discloses a process for producing low density cellular polyurethane foams by the reaction of an organic polyisocyanate with short chain polyols and utilizing the sequential addition of a triol and diol as in U.S. Pat. No. 3,218,348. Typically, high molecular weight polyols along with trifunctional polyols had been used for foams. The cellular polyurethanes were prepared by first reacting an isocyanate with a diol/triol mixture and removing free isocyanate from the reaction product. The reaction product was dissolved in a solvent and then reacted with a polyester polyol to form polyurethane systems.

U.S. Pat. No. 3,020,249 discloses a process for preparing rigid and semi-rigid polyurethane foams from an alkyd polyester resin and a diisocyanate containing reaction product derived from the reaction of toluenediisocyanate and 1,2,6-hexanetriol. The hexanetriol containing excess diisocyanate adducts were formed by reacting toluenediisocyanate with hexanetriol containing excess diisocyanate at temperatures of 100°-120° C.; the toluenediisocyanate was included in substantial excess.

U.S. Pat. No. 3,023,228 discloses a process for producing solid low molecular weight urethane polyisocyanate/urea systems by reacting a diisocyanate e.g., toluenediisocyanate, with a mixture of a short chain diol, e.g. butanediol, and water in the presence of a solvent, e.g., acetonitrile. Temperatures from about 10°-35° C. are suggested as being suited for forming the reaction product. An example shows reacting toluenediisocyanate with ethylene glycol in the presence of water and acetone (solvent) for about one to two hours at which time the reaction mixture solidifies. Another example described the reaction of toluenediisocyanate with diethylene glycol and water to produce a product having a softening point of 155° C. and an isocyanate content of 23.5%. The resulting low molecular weight products having an isocyanate content typically from 18–25%, are valuable as reactants in the production of polyurethane plastics.

SUMMARY OF THE INVENTION

This invention relates to a solvent-free process for producing urethane systems, particularly adapted for producing solid molded objects, and to the elastomer. The basic process in manufacturing polyurethane systems requires the reaction of an aromatic diisocyanate with a compound having active Zerewitinoff hydrogen atoms and usually a chain extender. The improvement in the basic process and constituting the basis of this invention comprises including in the polyurethane/urea elastomer a urethane-linked toluenediisocyanate (ULTDI) having a low melting point as the isocyanate component. The urethane-linked toluenediisocyanates having a low melting point are formed by the reaction of 2,4- and 2,6-toluenediisocyanate with specific aliphatic difunctional polyols in a manner such that a specific isomer ratio of 2,4- and 2,6-toluenediisocyanate is reacted with the polyol. The reaction is carried out under anhydrous conditions at a temperature sufficient to effect reaction of one isocyanate on the ring of toluenediisocyanate but insufficient to effect reaction of the second isocyanate group on the toluenediisocyanate ring. Excess isocyanate is utilized during the reaction to minimize oligomer formation. The reaction product is then isolated from the reaction medium and has the general formula:

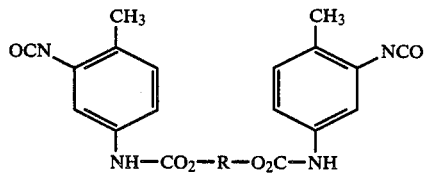

where R is the residue of a diol represented by the formula

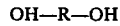

OH—R—OH where R is a $C_{2-12}$ alkylene radical having one or more of the following characteristics:

(a) one or more carbon-carbon unsaturated groups
(b) alkyl side chains having 2–6 carbon atoms or
(c) 1 to 3 ether oxygen atoms.

Included in the group of aliphatic diols are 1,2-butanediol, diethylene glycol, 2-butene-1,4-diol, dipropylene glycol, triethylene glycol and tripropylene glycol. Generally, the level of the 2,4-isomer in the reaction product should be from 45 to 90% by weight and the level of 2,6-isomer should be from 10 to 55% by weight.

The urethane linked toluenediisocyanates (ULTDI) are unique and provide multiple advantages in elastomer synthesis. These advantages include:

polyurethane elastomers having variable isocyanate content/unit weight;

low melting or fluid characteristics at room temperature thus eliminating the need for solvents to effect processing;

very high solubility in toluenediisocyanate or methylene di(phenylisocyanate);

a mechanism through the inclusion of highly reactive functional groups, i.e. two isocyanate groups, for producing polyurethane and polyurethane/urea elastomers;

an ability to produce polyurethanes suited for cast molding of solid objects due to the use of less reactive isocyanate systems as compared to methylenedi(phenylisocyanate) and yet adjust reactivity through selection of chain extenders of variable reactivity; and a wide range of polymer performance capability through hard segment and soft segment concentration and a variety of different elastomeric properties in terms of hardness, tensile and tear resistance.

DETAILED DESCRIPTION OF THE INVENTION

In the practice of this invention, the urethane-linked toluenediisocyanates (ULTDI) for use in preparing the polyurethane/urea elastomers are prepared by reacting toluenediisocyanate or substituted derivative with nonsymmetric aliphatic diols and select aliphatic ether polyols to produce low molecular weight (dimer) systems. Representative toluenediisocyanates for producing the urethane linked toluenediisocyanate include the two main isomers, i.e., the 2,4- and the 2,6-diisocyanate and optionally, a small amount (0–5% by weight) of the ortho isomers, e.g. the 2,3- and 3,4- isomers. Commercially, toluenediisocyanate is produced as a 65:35 or 80:20 isomer mix of the 2,4- and 2,6-isomer by weight and from 0–5% by weight of the ortho isomers. Substituted derivatives of toluenediisocyanate also can be used and these derivatives include $C_{1-6}$ alkyl and alkenyl derivatives such as xylenediisocyanate, diethyltoluenediisocyanate, tert-butyl-toluenediisocyanate, isopropyl derivatives of toluenediisocyanate, cyclopentyl toluenediisocyanate, cyclopentenyl toluenediisocyanate, butenyl toluenediisocyanate and the like. Halogenated derivatives such as chlorotoluenediisocyanates also can be used to form the ULTDI.

The other reactant used in the process of forming the urethane linked toluenediisocyanate (ULTDI dimer) is a nonsymmetric aliphatic difunctional polyol having from 4–10 carbon atoms or a symmetric aliphatic ether represented by the formula:

OH—R—OH where R is a $C_{2-12}$ alkylene radical having one or more of the following characteristics:

(a) one or more carbon-carbon unsaturated groups
(b) alkyl side chains having 2–6 carbon atoms or
(c) 1 to 3 ether oxygen atoms.

Preferred diols are selected from the group consisting of diethylene glycol, 1,2-butanediol, 1,4-but-2-ene diol, dipropylene glycol, triethylene glycol and tripropylene glycol. Others included in the group having alkyl side chains are 1,2-pentane diol, 1,2-hexane diol, 1,2-heptane diol and 1,2 octane diol.

Although it is conventional to use long chain polyols and particularly polymeric polyols having molecular weights of at least 500, preferably 650 to 2900 and above, to form isocyanate prepolymers, these polymeric polyols do not permit the formation of toluenediisocyanate compositions having high isocyanate content per unit weight. Although they are low melting systems, they commonly contain unreacted toluenediisocyanate in order to keep the isocyanate content to an acceptable level. Another disadvantage of polyisocyanate prepolymers derived from long chain polyols is that they are limited to a specific molecular weight range which is dependent upon the polyol molecular weight. Other toluenediisocyanate-polyol products have melting points above 50° C., and generally above 40° C. and the systems are suited only for coatings and lacquers. Such systems require a solvent. Examples of symmetric glycols which give high melting systems, and noted in the prior art, include ethylene glycol, 1,3-propanediol and 1,4-butanediol. Triols are unsuited for use in preparing the ULTDI systems because they tend to crosslink and result in polyurethane formulations which are not elastomers. Therefore any level of triol above 0.1 equivalent isocyanate is unsuited.

The reaction products of this invention have broadly from 45–90% of the 2,4-isomer and 10–55% of the 2,6-isomer, and preferably from about 60 to 85% of the 2,4-isomer and 15–40% of the 2,6-isomer. It is this isomer weight ratio in the product that is desired. In order to obtain this ratio in the final product however, a reaction feed having a greater 2,6-isomer content than 20% is required because of its lower reactivity than the 2,4-isomer. Reactant feed ratios of from 20 to 60% by weight of the 2,4-isomer and from 40–80% of the 2,6-isomer are commonly required to achieve an appropriate ratio of reacted isomers. This level is achieved in a commercial feedstock by recycling unreacted 2,6-isomers and thereby reducing the concentration of 2,4-isomer.

Although not intending to be bound by theory, it is believed a primary reason one can form the urethane linked toluenediisocyanate as defined herein is because the uncatalyzed reaction of a first isocyanate group of toluenediisocyanate is relatively fast and the reaction of an uncatalyzed second isocyanate group of toluenediisocyanate with a hydroxy group is relatively slow. Because of this difference in reactivity between the first isocyanate group and the second isocyanate group in the toluenediisocyanate ring whether the isomer is either the 2,4- or 2,6-isomer, one can, with appropriate temperature control, terminate the reaction after formation of the urethane linked toluenediisocyanate dimer via reaction of the first isocyanate group and prior to the reaction of the second isocyanate group. There is some formation of oligomers, i.e., 3 or more toluenediisocyanate molecules in the composition even with appropriate control. An oligomer content of 10% by weight and preferably 5% or less in the overall reaction product is desired as they may adversely affect elastomer properties.

Even though there is an apparent difference in reactivity between the first and second isocyanate groups in a toluenediisocyanate molecule, extreme care must be taken in order to prevent the reaction of the second isocyanate group with either a first or second hydroxy group of the diol molecule to prevent the formation of oligomers. Several criteria must be observed in order to produce the urethane linked toluenediisocyanate compositions; they are: one, the reaction is carried out at a temperature sufficiently low, e.g. 90° C. or less, and for a time, such that only the first isocyanate group in the toluenediisocyanate reacts; and two, the isocyanate reactant is present in a substantial excess of the required 2:1 stoichiometric molar ratio. The mole ratio of toluenediisocyanate to polyol should be at least 4:1, generally 4–30:1 and preferably from 8 to 16:1.

As stated, a major parameter influencing the selective formation of urethane linked toluenediisocyanates is temperature. Temperature may vary depending upon the reactivity of the aliphatic diol utilized but reactivity varies only slightly. The temperature of reaction for preparing such urethane linked toluenediisocyanate ranges from about −25° C. to below about 90° C., and preferably from about 20° to 40° C. When the temperature of reaction is increased above the 40° C. level e.g. to about 50°–80° C., one may experience substantial formation of oligomers.

Solvents can be used in the reaction to produce the ULTDI and if used, one is selected in which the reactants and reaction product are soluble but which do not interfere with the reaction between the difunctional aliphatic diol and toluenediisocyanate or derivative thereof. Examples of solvents suited for practicing the process include acetone, dioxane, tetrahydrofuran, acetonitrile and so forth. Of these solvents, tetrahydrofuran is least desirable since it is often contaminated from the formation of peroxides. It is preferred to carry out the reaction in the absence of solvent in that it eliminates process steps required for the recovery of the solvent prior to urethane elastomer formulation. Anhydrous conditions must be maintained during the reaction in view of the fact that water will react with the isocyanate groups resulting in formation of a urea linkage. When these linkages are present, the sofening point increases as noted in U.S. Pat. No. 3,023,288.

A simple way of determining an appropriate temperature range or temperature for a given reactant system requires an initial monitoring of the reaction through high performance liquid chromatography (HPLC). Liquid chromatography provides for the characterization of the reaction product in that it permits one to identify reactants, intermediates and high molecular weight oligomers. By monitoring free isocyanate content, and the extent of intermediate formation, one can then select a preferred temperature range and reaction time to permit synthesis of the urethane linked toluenediisocyanates in high yield and selectivity without forming substantial quantities of oligomers. Of course, as the temperature is increased within this particular range, one will notice that a product mix will form and such mix may possibly contain some higher molecular weight oligomers. If oligomer content is excessive, e.g., above 10% by weight, the temperature should be reduced and isocyanate reactant level increased to minimize oligomer production and maximize the production of urethane linked toluenediisocyanate.

The ratio of toluenediisocyanate to short chain aliphatic diol may vary over a wide range since the urethane linked toluenediisocyanate is relatively stable in the presence of both reactants and reaction product. However, as previously stated for purposes of minimizing oligomer formation, e.g., to a level of less than 2% by weight and facilitating separation of reactant from product, a reactant ratio of NCO/OH substantially greater than stoichiometric (2:1) is used, e.g., 4–30 moles toluenediisocyanate per mole aliphatic difunctional diol and preferably from 8–12 moles toluenediisocyanate per mole diol is utilized.

The reaction product is recovered from the reaction mixture in conventional manner. Excess isocyanate, for example, may be removed from the reaction product by distillation or extraction.

The solid polyurethane elastomers of this invention are formed by reacting an aromatic polyisocyanate with a composition having hydrogen atoms of sufficient reactivity to react with the isocyanate group (commonly determined by the Zerewitinoff technique) and chain extended with an aromatic diamine. The polyurethanes are formed by conventional techniques such as liquid casting and one-shot techniques. By and large the prepolymer technique is used to produce the final elastomeric products. Examples of products that can be produced in accordance with this process include housings, seals, pump impellers, tires and wheels, shoe heels and soles, rollers, gears, coupling devices and the like.

Elastomeric polyurethanes/ureas are formed by reacting an aromatic diisocyanate with a polyol or aminated polyether polyol and substituting the urethane linked diisocyanate for the aromatic diisocyanate. Either all or part of the total isocyanate functionality may be provided by the urethane linked diisocyanate. Preferably, at least 90% of the total equivalents isocyanate required for the elastomer, are supplied by the urethane linked toluenediisocyanate and preferably from 98 to 100% of the total equivalents isocyanate functionality provided by the urethane linked diisocyanate. Polyols and aminated polyether polyols suited for practicing the invention include the oxybutylene glycols, polyester polyols such as polyethylene adipate, polypropylene adipate; polyether based polyols such as polypropylene glycol, polyethylene glycol, polybutylene glycol, tetramethylene glycol, aminated derivatives of such polyols and others commonly used.

An additional component usually used in formulating polyurethane/urea elastomers is a chain extender. These usually are short chain polyfunctional reactants, e.g., glycols, and diamines. Examples include, butane diol, ethylene glycol, propylene glycol, and aromatic diamines such as $C_{2-6}$ alkyl and alkenyl toluenediamines e.g., diethyltoluenediamine, cyclopentenylenediamine, tertiarybutyltoluenediamine, butenyltoluenediamine, methylene bis(orthochloroaniline), chlorotoluenediamine, methylenedianiline and the like. They can be used in the practice of this invention in conventional amounts.

The following examples are provided to illustrate various embodiments of the invention and are not intended to restrict the scope thereof.

EXAMPLE 1

Toluenediisocyanate-1,2-butanediol ULTDI

To a clean, dry reaction flask equipped with a mechanical stirrer, thermometer, dropping funnel heating-/cooling jacket and nitrogen purge, were added isomer mixtures containing 50% by weight 2,4- and 50% by weight of 2,6-toluenediisocyanate. A portion of 1,2-butanediol was added slowly over a two-hour period thereby providing an 8:1 NCO/OH mole ratio. The temperature was maintained from 20°–40° C. with constant agitation and by adjusting flow of water through the jacket. After all of the butanediol had been added, the reaction mixture was stirred for eight hours to ensure reaction. The product was recovered by distilling at 100° C. and 0.1 mm Hg in a wiped film apparatus to remove unreacted toluenediisocyanate. The final product had an 80% 2,4-content, a 20% 2,6-content and a 30° C. softening point.

EXAMPLE 2

Effect of Diol on Melting or Softening Point

To a clean, dry reaction flask, variable amounts of a 50/50 mix of 2,4- 2,6-isomer system of toluenediisocyanate and variable diols were added to generate a product mix having an isomer ratio by weight of approximately 80% of a 2,4- and 20% of a 2,6-isomer mix. The preselected diols were added drop-wise over a one hour period. Reaction conditions, e.g., the 8:1 isocyanate to diol mole ratio remained essentially the same as in Example 1. Table I sets forth the results.

TABLE I

| | ULTDI Physical Properties | | | | |
|---|---|---|---|---|---|
| Diol | ULTDI Isomer % 2,4–2,6- | Softening point (°C.) | Solubility in TDI (wt) | % NCO (Theo.) | Viscosity 7000 cps at |
| 1,2-Ethanediol | 80.1/19.9 | 145–155 | 10% | Not Available | — |
| 1,2-Propanediol | 81.0/19.0 | 120–125 | 10% | 20.2 (19.9) | — |
| 1,2-Butanediol | 80.9/19.1 | 30–32 | 50% | 19.0 (19.1) | 85° C. |
| 1,3-Butanediol | 80.4/19.6 | 85–90 | 10% | 16.5 (19.1) | — |
| 1,4-Butanediol | 80.0/20.0 | 95–100 | 10% | 18.8 (19.1) | — |
| 1,4-But-2-enediol | 80.0/20.0 | <20 | 50% | 18.2 (19.3) | 70° C. |
| 1,4-But-2-ynediol | 80.0/20.0 | 80–85 | 10% | Not Available | |
| 1,6-Hexanediol | 81.1/18.9 | 120–123 | 10% | 14.7 (18.0) | — |
| 2-Methylpentane-2,4-diol | 74.2/25.8 | <20 | 50% | 17.6 (18.1) | 130° C. |
| Diethyleneglycol | 83.0/17.0 | <20 | 50% | 18.5 (18.8) | 67° C. |
| Dipropyleneglycol | 80.0/20.0 | <20 | 50% | 16.9 (17.4) | 85° C. |
| Triethylene glycol | 78.5/21.5 | <20 | 50% | 16.5 (16.9) | 61° C. |
| Tripropylene glycol | 80.6/19.4 | <20 | 50% | 15.5 (15.6) | 70° C. |

From Table I above, it can be seen that the nonsymmetric 1,2 butanediol, 1,4-but-2-enediol, 2-methylpentane-2,4-diol and the symmetrical ether diols ULTDI systems have acceptable softening points. Although the 2-methylpentane 2,4-diol ULTDI system has a low softening point, it decomposes at normal elastomer cure temperatures. The symmetrical diols, e.g. 1,2-ethanediol and 1,4-butanediol, had high softening points. In addition, the low melting ULTDI systems derived from the nonsymmetric diols have low viscosity (7000 CPS) at moderate temperatures and are soluble in polyisocyanate compositions such as toluenediisocyanate. All of the other ULTDI systems are high melting at about 80:20 isomer ratio from the above Table II. Some of the above compositions existed as solids at room temperature and had glass characteristics. Those with a softening point (T° C. at which solid would flow under its own weight) of less than 20° C. were gummy at room temperature. No attempt was made to determine the actual subambient melting or softening point of the gums.

EXAMPLE 3

Preparation of Urethanes Having Various Chain Extender Levels

Polyurethane and polyurethane/urea elastomer plaques were prepared from urethane linked toluenediisocyanate-BDO polyol system from Example 1 having approximately 80% of the 2,4-isomer and 20% of the 2,6-isomer in conventional manner. The elastomers were based upon an isocyanate index of 1.05 and reacted with poly(tetramethylene glycol) sold under the trademark Terathane 1000. The urethane linked toluenediisocyanate incorporated in the specific systems was varied as shown in Table 2 as were equivalents Moca chain extender. The components were mixed and poured into a two-piece 6×6×⅛ inch mold. The mold was closed and pressed at 2400 pounds at 100° C. for 4 hours.

The elastomer then was demolded and post cured at 100° C. for 12 hours. The results are shown in Table 2.

EXAMPLE 4

Preparation of Polyurethane Using Various Polyols

The procedure of Example 4 was repeated except that the polytetramethylene glycol Terathane 1000 was removed and a 650 mw diol sold under the trademark Terathane 650 was substituted for the Terathane 1000. The attempt was to determine the influence of the polyol on the overall elastomeric properties as compared to the Terathane 1000 system. Table 3 provides the level of components and the physical test data for such placques.

TABLE 3

| Example # | Component A<br>ULTDI of Example 1 | Component B<br>Terathane 650 + MoCA |
|---|---|---|
| 16 | 38.3 parts | 56.2 parts + 0.0 parts |
| 17 | 38.3 parts | 49.1 parts + 2.8 parts |
| 18 | 38.7 parts | 46.4 parts + 3.9 parts |
| 19 | 35.6 parts | 38.9 parts + 5.1 parts |
| 20 | 46.0 parts | 33.9 parts + 13.3 parts |

| | Variation of T-650/MoCA Ratio | | | | |
|---|---|---|---|---|---|
| Example # | 16 | 17 | 18 | 19 | 20 |
| ULTDI (equivalents) | 1.050 | 1.050 | 1.050 | 1.050 | 1.050 |
| T-650 (equivalents) | 1.000 | 0.875 | 0.825 | 0.750 | 0.500 |
| MoCA (equivalents) | 0.000 | 0.125 | 0.175 | 0.250 | 0.500 |
| Shore A Hardness | 75 | 93 | 96 | 97 | 98 |
| Shore D Hardness | 33 | 47 | 56 | 67 | 80 |
| 100% tensile (psi) | 330 | 620 | 1420 | 3340 | — |
| 200% tensile (psi) | 460 | 1030 | 2200 | 4570 | — |
| 300% tensile (psi) | 700 | 1750 | 3340 | — | — |
| Break tensile (psi) | 2200 | 3650 | 4550 | 6060 | 5610 |
| % elongation (%) | 630 | 500 | 400 | 290 | 30 |
| Tear resistance (pli) | 230 | 380 | 560 | 1090 | 970 |

TABLE 2

| Run | Component A<br>ULTDI of Example 1 | Component B<br>Terathane 1000 + MoCA |
|---|---|---|
| 5 | 27.3 parts | 59.6 parts + 0.0 parts |
| 6 | 31.1 parts | 59.2 parts + 2.2 parts |
| 7 | 30.7 parts | 57.5 parts + 2.7 parts |
| 8 | 30.8 parts | 55.9 parts + 3.1 parts |
| 9 | 30.7 parts | 54.1 parts + 3.5 parts |
| 10 | 30.8 parts | 52.4 parts + 4.0 parts |
| 11 | 31.8 parts | 52.6 parts + 4.6 parts |
| 12 | 30.7 parts | 42.2 parts + 6.6 parts |
| 13 | 34.5 parts | 37.7 parts + 9.9 parts |
| 14 | 38.3 parts | 31.7 parts + 13.8 parts |
| 15 | 46.1 parts | 25.4 parts + 20.0 parts |

| | Variation of T-1000/MoCA Ratio | | | | | | | | | | |
|---|---|---|---|---|---|---|---|---|---|---|---|
| Example # | 5 | 6 | 7 | 8 | 9 | 10 | 11 | 12 | 13 | 14 | 15 |
| ULTDI (equivalents) | 1.050 | 1.050 | 1.050 | 1.050 | 1.050 | 1.050 | 1.050 | 1.050 | 1.050 | 1.050 | 1.050 |
| T-1000 (equivalents) | 1.000 | 0.875 | 0.850 | 0.825 | 0.800 | 0.775 | 0.750 | 0.625 | 0.500 | 0.375 | 0.250 |
| MoCA (equivalents) | 0.00 | 0.125 | 0.150 | 0.175 | 0.200 | 0.225 | 0.250 | 0.375 | 0.500 | 0.625 | 0.750 |
| Shore A Hardness | 64 | 68 | 73 | 74 | 80 | 82 | 85 | 96 | 98 | 98 | 98 |
| Shore D Hardness | 25 | 32 | 33 | 32 | 33 | 37 | 37 | 59 | 68 | 76 | 83 |
| 100% tensile (psi) | 250 | 260 | 310 | 340 | 460 | 500 | 660 | 2160 | 4430 | 6430 | — |
| 200% tensile (psi) | 330 | 360 | 410 | 480 | 640 | 700 | 980 | 3300 | 5980 | — | — |
| 300% tensile (psi) | 390 | 480 | 540 | 650 | 850 | 980 | 1450 | 4930 | — | — | — |
| Break tensile (psi) | 1500 | 1800 | 1660 | 2150 | 2580 | 2880 | 4070 | 5290 | 6180 | 6670 | 1790 |
| % elongation (%) | 760 | 780 | 750 | 740 | 760 | 670 | 670 | 330 | 220 | 140 | 20 |
| Tear resistance (pli) | 180 | 180 | 200 | 220 | 290 | 320 | 440 | 753 | 1150 | 1040 | 140 |

From the results in Table 2, it can be noted that the utilization of the urethane-linked diisocyanate permits one to alter the ratio of tetramethylene glycol or alternatively the ratio of aromatic diamine equivalents to isocyanate equivalents in the elastomer formulation to produce a wide property range. This ability permits one to alter the hardness of the elastomer due to the increased aromatic diamine content as noted in the runs, for example, from Shore A 64 to a high of about Shore D 83 at 0.75 equivalents per 1.05 equivalent of isocyanate. One can also increase the tensile strength at break and tear resistance through the ability to increase levels of aromatic diamine. Of course, as might be expected, the percent elongation decreases with increased tear resistance and tensile strength.

From the results in Table 3, it should be noted that in the urethane-linked diisocyanate elastomer systems the aromatic diamine content used for chain extension can be varied, as in Example 4 to provide elastomers having different property values. Again, it should be noted as in Example 4, the hardness of the elastomer and tear resistance increased with increased aromatic diamine concentration.

EXAMPLE 6

The procedure of Example 4 was repeated except that a polyol sold under the trademark Terathane 2000 was substituted for the Terathane 1000. The intent was to determine the effect of the soft segment polyol on the overall properties of the elastomer. Table 4 provides results of such testing.

TABLE 4

| Example # | Component A<br>ULTDI of Example 1 | Component B<br>Terathane 2000 + MoCA |
|---|---|---|
| 21 | 23.0 parts | 101.4 parts |
| 22 | 38.3 parts | 139.6 parts + 3.9 parts |
| 23 | 22.9 parts | 76.1 parts + 3.3 parts |
| 24 | 30.8 parts | 84.7 parts + 6.6 parts |
| 25 | 25.6 parts | 56.3 parts + 7.4 parts |
| 26 | 38.4 parts | 42.1 parts + 16.6 parts |

| Variation of T-2000/MoCA Ratio | | | | | | |
|---|---|---|---|---|---|---|
| Example # | 21 | 22 | 23 | 24 | 25 | 26 |
| ULTDI (equivalents) | 1.050 | 1.050 | 1.050 | 1.050 | 1.050 | 1.050 |
| T-2000 (equivalents) | 1.000 | 0.825 | 0.750 | 0.625 | 0.500 | 0.250 |
| MoCA (equivalents) | 0.00 | 0.175 | 0.50 | 0.375 | 0.500 | 0.750 |
| Shore A Hardness | 59 | 66 | 75 | 82 | 87 | 97 |
| Shore D Hardness | 24 | 24 | 29 | 36 | 37 | 64 |
| 100% tensile (psi) | 200 | 210 | 450 | 520 | 750 | 3710 |
| 200% tensile (psi) | 210 | 260 | 580 | 730 | 1180 | — |
| 300% tensile (psi) | 220 | 310 | 730 | 1010 | 1740 | — |
| Break tensile (psi) | 910 | 1480 | 2960 | 2790 | 2430 | 3860 |
| % elongation (%) | 730 | 840 | 820 | 690 | 420 | 130 |
| Tear resistance (pli) | 120 | 170 | 310 | 380 | 440 | 850 |

EXAMPLE 7

Polyurethane Portion Synthesized with Various Aromatic Diamine Chain Extenders The procedure of Example 4 was repeated for the preparation of polyurethane elastomer systems with the exception that methylene bis(orthochloroaniline) (MOCA) chain extender was replaced by various slow, then fast reacting diamine chain extenders even those normally associated with RIM processing techniques such as DETDA and t-BTDA. The level of chain extender was maintained at 0.175 parts per 1.05 parts urethane-linked diisocyanate with the polyol content being 0.825 equivalents. The procedure then was repeated at 0.375 equivalents chain extender per 1.05 equivalents isocyanate. The polyol level was reduced to 0.625 equivalents. Tables 5 and 6 provide those results illustrating the improved processability inherent in the ULTDI one shot elastomer synthesis.

TABLE 5

| Example # | Component A<br>ULTDI of Example 1 | Component B<br>Terathane 1000 | Chain Extender |
|---|---|---|---|
| 30 | 30.9 parts | 42.2 parts | 6.6 parts MoCA - methylene bis(orthochloroaniline) |
| 31 | 30.7 parts | 55.8 parts | 3.2 parts Cyanacure - commercial diamine |
| 32 | 30.7 parts | 55.9 parts | 2.1 parts t-BTDA - tert-butyl toluenediamine |
| 33 | 30.7 parts | 55.8 parts | 3.7 parts Curene-158 - commercial diamine |
| 34 | 31.1 parts | 55.8 parts | 1.8 parts Cl—TDA - chlorotoluenediamine |
| 35 | 30.8 parts | 55.9 parts | 3.7 parts Polacure - commercial diamine |
| 36 | 27.0 parts | 49.2 parts | 1.8 parts DETDA - diethyltoluenediamine |
| 37 | 30.7 parts | 56.0 parts | 2.8 parts PU-1604 - commercial diamine |
| 38 | 30.9 parts | 55.8 parts | 3.1 parts DABA - diaminobenzoic acid amide |
| 39 | 30.8 parts | 55.8 parts | 3.6 parts MDotBA - methylene bis(ortho t-butyl aniline) |

| Chain Extender Variation | | | | | | | | | | |
|---|---|---|---|---|---|---|---|---|---|---|
| Example # | 30 | 31 | 32 | 33 | 34 | 35 | 36 | 37 | 38 | 39 |
| Chain Extender | MoCA | Cyanacure | t-BDTA | Curene-158 | Cl—TDA | Polacure | DETDA | PU-1604 | DABA | MDOTBA |
| ULTDI (equivalents) | 1.050 | 1.050 | 1.050 | 1.050 | 1.050 | 1.050 | 1.050 | 1.050 | 1.050 | 1.050 |
| T-1000 (equivalents) | 0.825 | 0.825 | 0.825 | 0.825 | 0.825 | 0.825 | 0.825 | 0.825 | 0.825 | 0.825 |
| Ch. Ext. (equivalents) | 0.175 | 0.175 | 0.175 | 0.175 | 0.175 | 0.175 | 0.175 | 0.175 | 0.175 | 0.175 |
| Shore A Hardness | 74 | 69 | 72 | 73 | 72 | 74 | 73 | 78 | 73 | 74 |
| Shore D Hardness | 32 | 31 | 30 | 32 | 30 | 32 | 32 | 36 | 32 | 32 |
| 100% tensile (psi) | 340 | 310 | 320 | 340 | 280 | 400 | 410 | 530 | 370 | 520 |
| 200% tensile (psi) | 480 | 430 | 500 | 520 | 430 | 600 | 640 | 740 | 600 | 800 |
| 300% tensile (psi) | 650 | 610 | 750 | 810 | 640 | 930 | 930 | 1050 | 950<br>1130 | |
| Break tensile (psi) | 2150 | 2580 | 2670 | 2730 | 2780 | 2880 | 3310 | 3480 | 4000 | 4020 |
| % elongation (%) | 740 | 710 | 720 | 590 | 760 | 580 | 740 | 670 | 670 | 660 |
| Tear resistance (pli) | 220 | 220 | 250 | 230 | 230 | 270 | 290 | 340 | 280 | 370 |

TABLE 6

| Example # | Component A<br>ULTDI of Example 1 | Component B<br>Terathane 1000 | Chain Extender |
|---|---|---|---|
| 40 | 38.8 parts | 52.9 parts | 5.6 parts t-BTDA |
| 41 | 38.6 parts | 52.9 parts | 5.6 parts DETDA |
| 42 | 33.1 parts | 45.4 parts | 7.4 parts Cyanacure |
| 43 | 33.5 parts | 45.4 parts | 8.4 parts Curene-158 |
| 44 | 32.8 parts | 45.4 parts | 8.4 parts Polacure |
| 45 | 38.4 parts | 52.9 parts | 9.7 parts MDotBA |
| 46 | 38.5 parts | 52.9 parts | 7.6 parts PU-1604 |
| 47 | 32.9 parts | 45.4 parts | 7.1 parts DABA |
| 48 | 33.0 parts | 45.4 parts | 7.1 parts MOCA |
| 49 | 33.8 parts | 45.4 parts | 4.2 parts Cl—TDA |

| Chain Extender Variation | | | | | | | | | | |
|---|---|---|---|---|---|---|---|---|---|---|
| Example # | 40 | 41 | 42 | 43 | 44 | 45 | 46 | 47 | 48 | 49 |
| Chain Extender | t-BTDA | DETDA | Cyanacure | Curene-158 | Polacure | MDOTBA | PU-1604 | DABA | MoCA | Cl—TDA |

TABLE 6-continued

| | | | | | | | | | | |
|---|---|---|---|---|---|---|---|---|---|---|
| ULTDI (equivalents) | 1.05 | 1.05 | 1.05 | 1.05 | 1.05 | 1.05 | 1.05 | 1.05 | 1.05 | 1.05 |
| T-1000 (equivalents) | 0.625 | 0.625 | 0.625 | 0.625 | 0.625 | 0.625 | 0.625 | 0.625 | 0.625 | 0.625 |
| Ch. Ext. (equivalents) | 0.375 | 0.375 | 0.375 | 0.375 | 0.375 | 0.375 | 0.375 | 0.375 | 0.375 | 0.375 |
| Shore A Hardness | 92 | 94 | 92 | 95 | 94 | 96 | 96 | 94 | 95 | 91 |
| Shore D Hardness | 44 | 47 | 47 | 51 | 48 | 49 | 53 | 48 | 49 | 45 |
| 100% tensile (psi) | 1190 | 1390 | 1120 | 1710 | 1880 | 1550 | 1520 | 1450 | 1650 | 1440 |
| 200% tensile (psi) | 1830 | 2010 | 1720 | 2580 | 2630 | 2330 | 2300 | 2260 | 2510 | 2340 |
| 300% tensile (psi) | 2680 | 2830 | 2580 | 3780 | 3710 | 3410 | 3430 | 3350 | 3630 | 3600 |
| Break tensile (psi) | 3950 | 4230 | 4720 | 4960 | 4980 | 5150 | 5310 | 5410 | 5420 | 5590 |
| % elongation (%) | 450 | 470 | 560 | 410 | 410 | 500 | 510 | 510 | 490 | 490 |
| Tear resistance (pli) | 630 | 720 | 560 | 690 | 750 | 770 | 750 | 670 | 720 | 670 |

EXAMPLE 8

Synthesis of Low Hysteresis Elastomers

A hand-cast elastomer was synthesized using the tractable urethane-linked toluenediisocyanate (ULTDI) containing approximately 80% of the 2,4- and 20% of the 2,6-toluenediisocyanate reacted with 1,2-butanediol as formed in Example 1. The elastomers were generated using Terathane 1000 (polytetramethylene glycol) and MOCA with the polyol equivalents being 0.625 and MOCA equivalents being 0.375. The castings were made by mixing the components together and pouring into a 2.5 by ⅜" two-piece mold and pressed to 2400 pounds and 100° C. for one hour. The elastomer was demolded and post-cured for 12 hours at 100° C.

A comparison elastomer was made by substituting a toluenediisocyanate polyol prepolymer sold under the trademark ADIPRENE L-167 for the ULTDI prepolymer system. For the urethane-linked toluenediisocyanate to accomplish this, 169.6 parts ADIPRENE L-167 were mixed with 33.3 parts of MOCA by first melting the MOCA at 125° C. and then heating the ADIPRENE L-167 prepolymer to a temperature of 85° C., then mixing and then molding as described above.

Hysteresis testing was carried out by using an Instron Model 1350 servohydraulic test machine. The internal block temperatures of the specimens were measured throughout the test using a thermocouple inserted into a drilled hole in the center of the specimen. Data were reduced by displaying and plotting loads versus stroke at various times during the test. Hysteresis was then calculated from the area between the loading and unloading curves using a computer analysis program. Compression-compression fatigue testing was performed on the specimens at 20 hertz with a maximum load of 4500 pounds and a ratio of minimum to maximum load to 0.1. Testing was continued for 200,000 cycles and for a time of 167 minutes.

The hysteresis for the urethane-linked toluenediisocyanate ULTDI system at the 0.375 equivalent level was 2.1 inch-pounds and the temperature increase was 10° C. The ADIPRENE L-167 system exhibited a hysteresis of 5.1 inch-pounds and the temperature increase was 23° C. When the process was repeated at the 0.5 equivalent level to give a Shore D hardness 68, a value unobtainable with the ADIPRENE L-167 system, the hysteresis of the ULTDI based system was but 1.1 inch-pounds and the temperature increase was but 5° C. The above results show that the polyurethane systems synthesized using the urethane-linked diisocyanate as opposed to the conventional toluenediisocyanate prepolymer system exhibited lower hysteresis and reduced temperature increase on flexing than was obtainable with the commercial system.

EXAMPLE 8

Effect of 2,6-TDI Isomer in ULTDI

Polyurethane elastomers were prepared in accordance with Example 4 except that the urethane linked toluenediisocyanate 1,2-BDO system had various levels of the 2,6-TDI isomer in the product. The results are set forth in Table 7. MOCA stands for methylene bis(orthochloroaniline).

TABLE 7

2,6-TDI Isomer Effect on ULTDI Elastomers

| | | | | | | |
|---|---|---|---|---|---|---|
| 2,6-TDI isomer (%) | 0.0 | 3.2 | 12.9 | 19.1 | 29.3 | 54.6 |
| ULTDI (equivalents) | 1.05 | 1.05 | 1.05 | 1.05 | 1.05 | 1.05 |
| T-1000 (equivalents) | 0.825 | 0.825 | 0.825 | 0.825 | 0.825 | 0.825 |
| MOCA (equivalents) | 0.175 | 0.175 | 0.175 | 0.175 | 0.175 | 0.175 |
| Shore A Hardness | 73 | 74 | 73 | 74 | 81 | 84 |
| Shore D Hardness | 31 | 36 | 34 | 33 | 35 | 38 |
| 100% tensile (psi) | 260 | 280 | 270 | 330 | 480 | 810 |
| 200% tensile (psi) | 370 | 370 | 370 | 490 | 620 | 990 |
| 300% tensile (psi) | 500 | 480 | 480 | 710 | 770 | 1320 |
| Break tensile (psi) | 2030 | 2050 | 1920 | 2330 | 2400 | 4030 |
| % elongation (%) | 820 | 860 | 860 | 650 | 820 | 740 |
| Tear resistance (pli) | 180 | 180 | 180 | 220 | 290 | 440 |

The results in Table 7 show that as one increases the level of the 2,6-isomer in the ULTDI/BDO system at constant ULTDI equivalents in the polyurethane/urea elastomer, tensile and tear strength increase without substantially decreasing % elongation. Results at the 29% and 54% 2,6-level clearly show an increase in tensile strength and tear resistance when compared to the 13 and 19% level.

EXAMPLE 9

Oligomer Effect on ULTDI Elastomer

Two polyurethane elastomer plaques were prepared from the ULTDI/BDO high and low oligomer systems in the same manner as in Example 4. The elastomers were formulated with 45.4 parts of Terathane 1,000 polyol, 7.1 parts MOCA and 36.2 parts of ULDTI/BDO systems, one having 17.5% oligomer and the other 1.76%. The components were preheated to 85° C., mixed and formed into a mold. The mold was closed and pressed at 2400 psig and 100° C. for 2 hours. The elastomer then was cured at 100° C. for 12 hours. Table 8 provides results of physical properties.

TABLE 8

| | Physical Properties | |
|---|---|---|
| | High Oligomer | Low Oligomer |
| Reactant Ratio (TDI:BDO) | 3:1 | 8:1 |
| % Oligomer By Weight | 17.46 | 1.76 |
| % NCO | 17.40 | 19.01 |
| 2,6-TDI isomer (%) | 22.90 | 19.10 |
| ULTDI (equivalents) | 1.05 | 1.05 |
| T-1000 (equivalents) | 0.625 | 0.625 |
| MOCA (equivalents) | 0.375 | 0.375 |
| Shore A Hardness | 96 | 96 |
| Shore D Hardness | 55 | 59 |
| 100% tensile (psi) | 1760 | 2160 |
| 200% tensile (psi) | 2710 | 3300 |
| 300% tensile (psi) | 4000 | 4930 |
| Break tensile (psi) | 5600 | 5290 |
| % elongation (%) | 430 | 330 |
| Tear resistance (pli) | 670 | 750 |

The above results show that oligomer content does adversely affect elastomer properties. For example, tear resistance is substantially lower and tensile strength is less at the same percent 100-300% elongation compared to the low oligomer ULTDI elastomer.

EXAMPLE 10

RIM Elastomer Use

Reaction injection molded elastomers were prepared using a model SA8-20 laboratory machine (LIM Kunststoff Technologie GmbH, Kittsee, Austria) suitable for processing two component mixtures. 10-30 cc/min metering pumps for components "A" (MDI or DEG-ULTDI Table IV diisocyanate) and "B" (polyol plus chain extender plus catalysts) are driven synchronously by sprocket wheels in proportion to the mixture to be processed by means of a variable speed (50-250 rpm) motor. Any desired mixing ratio may be established by changing gears. Components A and B are conveyed into a mixing chamber by individually controlled compressed air actuated valves. A high speed rotor, continuously adjustable from 10,000 to 18,000 rpm, mixes the components. The pump block and mixing head are movable, and may be automatically advanced to a stationary mold by compressed air. A replaceable '0' ring accomplishes a seal between mixing head and mold.

Polyurethane-urea elastomers were made from commercial modified liquid methylene di(phenylisocyanate) MDI (Isonate 181 from Dow Chemical) or DEG-ULTDI reaction with high (5000 g/mole) molecular weight triol (Voranol 4815 from Dow Chemical) supplemented with aromatic diamine chain extender (diethyltoluenediamine or DETDA). An isocyanate index of 1.03 was sought for all elastomers and checked by machine 'calibration shots' of unmixed, unreacted A and B components through the model SA8-20 sampling ports designed for this purpose. Stream temperatures were set by controlled circulation of thermostatted water through the double walled A and B reservoirs, the mixing block temperature by electrical resistance heaters.

Molds were thermostatted before mounting on a jig to which the mixing head was conveyed during the injection molding operation. 200×200×2 mm and 200×200×3 mm cavities in nominally 26×27×4 cm aluminum molds were treated with mold release agents before each injection. After injection the mixing rotor was washed in situ with dioctylphthalate, blown clean with nitrogen and readied for the next injection shot as the mold was unmounted and opened.

Test plaques were cured for 1 hour at 121° C., freed of mold release agent, and properly conditioned for analytical testing by exposure to 23+/−2° C. at 50+/−5% relative humidity for 40 hours. Physical properties were measured in accordance with ASTM procedures. Hardness (ASTM D2240) and tensile (ASTM D1708) measurements are the average of five determinations each, tear resistance (ASTM D624, die C) the average of three determinations on die-cut 2 mm thick pieces. Yield tensile is reported for the crosslinked RIM elastomers due to the characteristic shape of the Instron stress-strain curve. Also tabulated are flexural modulus and maximum stress (ASTM D1708) determined on each of five 1"×3" specimens from the 3 mm plaques and sag, a measure of thermal stability (ASTM D3769) measured on 4" and 6" overhangs using 3 mm thick plaque samples. Table 9 provides the results.

TABLE 9

| Urethane-linked Toluene Diisocyanate RIM Elastomer | | |
|---|---|---|
| CH-EXTENDER | DETDA | DETDA |
| CH EX pph | 22 | 22 |
| POLYOL | V 4815 | V 4815 |
| ISOCYANATE | MDI | DEG-ULTDI |
| NCO index | 1.04 | 1.02 |
| Shore A Hardness | 95 | 96 |
| Shore D Hardness | 49 | 56 |
| 100% tensile (psi) | 1970 | 1890 |
| 200% tensile (psi) | 2720 | 2550 |
| 300% tensile (psi) | 3510 | 3210 |
| yield tensile (psi) | 1370 | 1550 |
| break tensile (psi) | 3770 | 3350 |
| % elongation (%) | 340 | 320 |
| tear resistance (pli) | 610 | 650 |
| maximum stress (psi) | 1420 | 1590 |
| flexural modulus (psi) | 28000 | 36350 |
| sag (125° C., 1 hr) ("/4") | 0.12 | 0.50 |
| sag (125 C., 1 hr) ("/6") | 0.77 | 2.14 |

In Table 9, the RIM elastomer made from the DEG-ULTDI system is superior in room temperture flexural modulus to that of a comparable piece made from the MDI quasi prepolymer. However, the thermal stability of the DEG-ULTDI based elastomer is inferior, presumably due to less phase segregation of less symmetric 'hard segment' made up of predominantly urea from reaction of isocyanate with amine chain extender. At equivalent pumpblock temperatures of 80° C. and B side stream temperatures of 52° C. the lower reactivity of the DEG/ULTDI/system was quantified by a mold fill study. At 81°–87° C. the DEG/ULTDI system completely filled a 3 mm mold (145-150 gram including mold runner fill) at the lowest machine pump speed. The MDI quasi prepolymer, despite a lower stream temperature of 71° C., only filled the mold ¾ full (114 g) before gelation backpressure exceeded machine fill conditions. This lower reactivity of the DEG/ULTDI system allows for the formation of polyurethane/ureas elastomers with greater chain extender content using equivalent machine fill rates.

EXAMPLE 11

Comparison Using Trimethylolpropane and Diol

A polyurethane polyisocyanate was prepared from 65/35 2,4-/2,6-TDI and a mixture of 1,3-butanediol and trimethylol propane following the procedure described in Example 2 of McElroy, U.S. Pat. No. 2,969,386. The product was isolated free of TDI using thin film distillation rather than McElroy's extraction technique.

More specifically, in a vessel equipped for heating, cooling and agitation was placed 174.6 parts by weight of toluenediisocyanate, consisting of isomers in the ratio of 65 parts 2,4-toluenediisocyanate to 35 parts of 2,6-toluenediisocyanate, and heated to 90° C. To this was added 30.0 parts by weight of a polyol mixture consisting of 21.0 parts trimethylol propane and 9.0 parts 1,3-butanediol. The addition was made over a period of about two and one-half hours, and the temperature was kept at about 88° to 100° C. during the addition of polyol to diisocyanate. The resulting product urethane polyisocyanate was a colorless viscous liquid when cooled to room temperature.

The urethane polyisocyanate/toluenediisocyanate solution was subject to thin film distillation described in Example 1.

Recovered urethane polyisocyanate—133.3 parts (theory—146.6)
Isocynate concentration—17.44% (theory—19.4%)
Free toluenediisocyanate—0.07%
Melting (flow) point—125°-135° C.

The high melting point of this product does not permit its use as component A in a solvent free process in polyurethane formulations.

What is claimed is:

1. In a solvent free process for producing a polyurethane/urea elastomer by reacting an aromatic diisocyanate with a compound having a plurality of active Zerewitinoff hydrogen atoms, the improvement for producing urethane/urea elastomers which comprises: including in said polyurethane/urea elastomer at least a portion of a urethane-linked toluenediisocyanate as said aromatic diisocyanate, said urethane-linked diisocyanate consisting of the reaction product of an isomer mix of 2,4- and 2,6-toluenediisocyanate and a short chain aliphatic diol selected from the group consisting of dipropylene glycol, diethylene glycol, 1,2-butanediol, 1,4-but-2-ene-diol, triethylene glycol and tripropylene glycol, the urethane linked diisocyanate containing from 45 to 90% by wt of the 2,4-toluenediisocyanate isomer and 10 to 55% of the 2,6-toluenediisocyanate isomer.

2. The process of claim 1 wherein the polyurethane/urea elastomer has a chain extender incorporated therein.

3. The process of claim 2 wherein the urethane-linked toluenediisocyanate is included in a proportion of at least 90% by weight of the total aromatic diisocyanate in said polyurethane/urea elastomer.

4. The process of claim 3 wherein the compound having active Zerewitinoff hydrogen atoms is a polyol.

5. The process of claim 4 wherein the polyol is a polyether polyol having a molecular weight from 650 to 2900.

6. The process of claim 4 wherein the chain extender is an aromatic diamine.

7. The process of claim 6 wherein the diol in said urethane-linked toluenediisocyanate is 1,2-butanediol.

8. The process of claim 6 wherein the percent 2,4-isomer in the urethane-linked is from 65-80% and the percent 2,6-isomer is from 20-35% by weight.

9. The process of claim 8 wherein said polyol is poly tetramethylene glycol or polycaprolactone diol.

10. The process of claim 6 wherein the aromatic diamine chain extender is selected from the group consisting of methylene bis(orthochloroaniline), $C_{2-6}$ alkyl and $C_{2-6}$ alkenyl substituted toluenediamine or chlorotoluenediamine.

11. The process of claim 10 wherein the aromatic diamine chain extender is diethyltoluene diamine or tert-butyl toluenediamine where the tert-butyl group is ortho to an amine group.

12. In a polyurethane/urea elastomer comprising the reaction product of an aromatic diisocyanate, a compound having active Zerewitinoff hydrogen atoms and a chain extender, the improvement which comprises the utilization of a urethane-linked toluene diisocyanate comprising the reaction product of toluenediisocyanate and a short chain diol selected from the group consisting of dipropylene glycol, diethylene glycol, 1,2-butanediol, 1,4-but-2-ene-diol, triethylene glycol, and tripropylene glycol.

13. In the polyurethane elastomer of claim 12 wherein the polyurethane/urea elastomer has a chain extender incorporated therein.

14. The polyurethane elastomer of claim 13 wherein the urethane-linked toluenediisocyanate is included in a proportion of at least 90% by weight of the total aromatic diisocyanate in said polyurethane/urea elastomer.

15. The polyurethane elastomer of claim 14 wherein the compound having active Zerewitinoff hydrogen atoms is a polyol.

16. The polyurethane elastomer of claim 15 wherein the polyol is a polyether polyol having a molecular weight from 650 to 2900.

17. The polyurethane elastomer of claim 15 wherein the chain extender is an aromatic diamine.

18. The polyurethane elastomer of claim 17 wherein the diol in said urethane-linked toluenediisocyanate is 1,2-butanediol.

19. The polyurethane elastomer of claim 18 wherein the percent 2,4-isomer in the urethane-linked is from 65-80% and the percent 2,6-isomer is from 20-35% by weight.

20. The polyurethane elastomer of claim 19 wherein said polyol is polytetramethylene glycol or polycaprolactone diol.

21. The polyurethane elastomer of claim 17 wherein the aromatic diamine chain extender is selected from the group consisting of methylene bis(orthochloroaniline), $C_{2-6}$ alkyl and $C_{2-6}$ alkenyl substituted toluenediamine or chlorotoluenediamine.

22. The polyurethane elastomer of claim 21 wherein the aromatic diamine chain extender is diethyltoluene diamine or tert-butyl toluenediamine where the tert-butyl group is ortho to an amine group.

23. The polyurethane elastomer of claim 17 wherein the aromatic diamine has been reacted with ethylene or propylene oxide.

* * * * *